United States Patent
Lin

(10) Patent No.: US 9,621,066 B2
(45) Date of Patent: Apr. 11, 2017

(54) MASTER/SLAVE CONTROL SYSTEM OF AC/DC POWER SUPPLY

(71) Applicant: CHYNG HONG ELECTRONIC CO., LTD., Taichung (TW)

(72) Inventor: Mu-Chun Lin, Taichung (TW)

(73) Assignee: CHYNG HONG ELECTRONIC CO., LTD., Taichung (TW)

(\*) Notice: Subject to any disclaimer, the term of this patent is extended or adjusted under 35 U.S.C. 154(b) by 395 days.

(21) Appl. No.: 14/292,356

(22) Filed: May 30, 2014

(65) Prior Publication Data

US 2015/0349534 A1 Dec. 3, 2015

(51) Int. Cl.
*H02J 1/00* (2006.01)
*H02M 7/00* (2006.01)
*H02J 1/10* (2006.01)
*H02M 7/23* (2006.01)
*H02M 1/00* (2006.01)

(52) U.S. Cl.
CPC ............ *H02M 7/003* (2013.01); *H02J 1/102* (2013.01); *H02M 7/23* (2013.01); *H02M 2001/0003* (2013.01); *Y10T 307/675* (2015.04)

(58) Field of Classification Search
CPC .............................. Y10T 307/675; H02J 4/00
USPC ............................................................ 307/75
See application file for complete search history.

(56) References Cited

U.S. PATENT DOCUMENTS

| 2007/0013490 | A1* | 1/2007 | Yanagida | G05B 19/052 340/538 |
| 2007/0091925 | A1* | 4/2007 | Miyazaki | H04B 3/542 370/469 |
| 2015/0139038 | A1* | 5/2015 | Riederer | H04L 41/12 370/256 |
| 2015/0338911 | A1* | 11/2015 | Yamamoto | H04L 69/323 713/323 |

\* cited by examiner

*Primary Examiner* — Jared Fureman
*Assistant Examiner* — Duc M Pham
(74) *Attorney, Agent, or Firm* — Ming Chow; Sinorica, LLC

(57) ABSTRACT

A master/slave control system of an AC/DC power supply includes a master device. The master device is able to supply AC and DC power. The master device is connected with a plurality of slave devices through a plurality of local area network transmission interfaces. The slave devices are able to supply AC and DC power. Through the local area network transmission interfaces, a control signal can be transmitted fast for the mater device and slave devices to carry out a master/slave control. The signal transmission efficiency of the master/slave control can be enhanced greatly, so that the master/slave control is more fast and prompt. The present invention avoids the arrangement of the traditional series data communication interface and the controller area network, and simplifies the configuration and wiring of the master device and the slave devices.

9 Claims, 4 Drawing Sheets

MASTER/SLAVE CONTROL SYSTEM OF AC/DC POWER SUPPLY

BACKGROUND OF THE INVENTION

1. Field of the Invention

The present invention relates to an AC/DC power supply, and more particularly to a master/slave control system of an AC/DC power supply.

2. Description of the Prior Art

A conventional AC/DC power supply usually uses a RS-232 or RS-485 series data communication interface to connect a master device and a slave device in order to simplify the complicated wiring and operation procedure for a master/slave control. In recent years, a controller area network (CAN-bus) is used to connect a master device and a slave device for the master/slave control of the AC/DC power supply. When the conventional AC/DC power supply carries out the mater/slave control through the RS-232 or RS-485 series data communication interface to connect the master device and the slave device or through the controller area network to connect the master device and the slave device, the control signal is transmitted very slowly. The speed of signal transmission is less than 1 Mbit, so the master/slave control between the master device and slave device cannot respond timely. For connecting the RS-232 or RS-485 series data communication interface or the controller area network, the master device and the slave devices must provide various USBs and other signal transmission ports. This causes many connecting configurations of the master device and the slave devices and complicated wiring. Accordingly, the inventor of the present invention has devoted himself based on his many years of practical experiences to solve these problems.

SUMMARY OF THE INVENTION

The primary object of the present invention is to provide a master/slave control system of an AC/DC power supply, which comprises a master device and a slave device connected through a local area network (LAN). The speed of the control signal transmission can be enhanced greatly, so that the master device and the slave device can carry out a master/slave control fast and timely.

A further object of the present invention is to provide a master/slave control system of an AC/DC power supply, which uses the local area network to connect the master device and the slave device to simplify the connecting configuration of the master device and the slave device, and the arrangement of series USB for the master device and the slave device can be omitted.

In order to achieve the aforesaid objects, the master/slave control system of an AC/DC power supply of the present invention comprises a master device, a plurality of slave devices, and a plurality of local area network transmission interfaces. The master device is able to supply AC and DC power. The master device is provided with a local area network port. The slave devices are able to supply AC and DC power. Each slave device is provided with a local area network port. The local area network transmission interfaces are respectively disposed between the master device and one of the slave devices and between the slave devices for connecting the master device and the slave devices.

The master/slave control system of the AC/DC power supply of the present invention uses the local area network transmission interfaces to transmit the control signal fast and to carry out the master/slave control for the mater device and slave devices. The signal transmission efficiency of the master/slave control can be enhanced greatly, so that the master/slave control is more fast and prompt. The present invention avoids the arrangement of the traditional series data communication interface and the control of the local area network, and simplifies the configuration and wiring of the master device and the slave devices.

DETAILED DESCRIPTION OF THE PREFERRED EMBODIMENTS

Embodiments of the present invention will now be described, by way of example only, with reference to the accompanying drawings.

Figure 1:
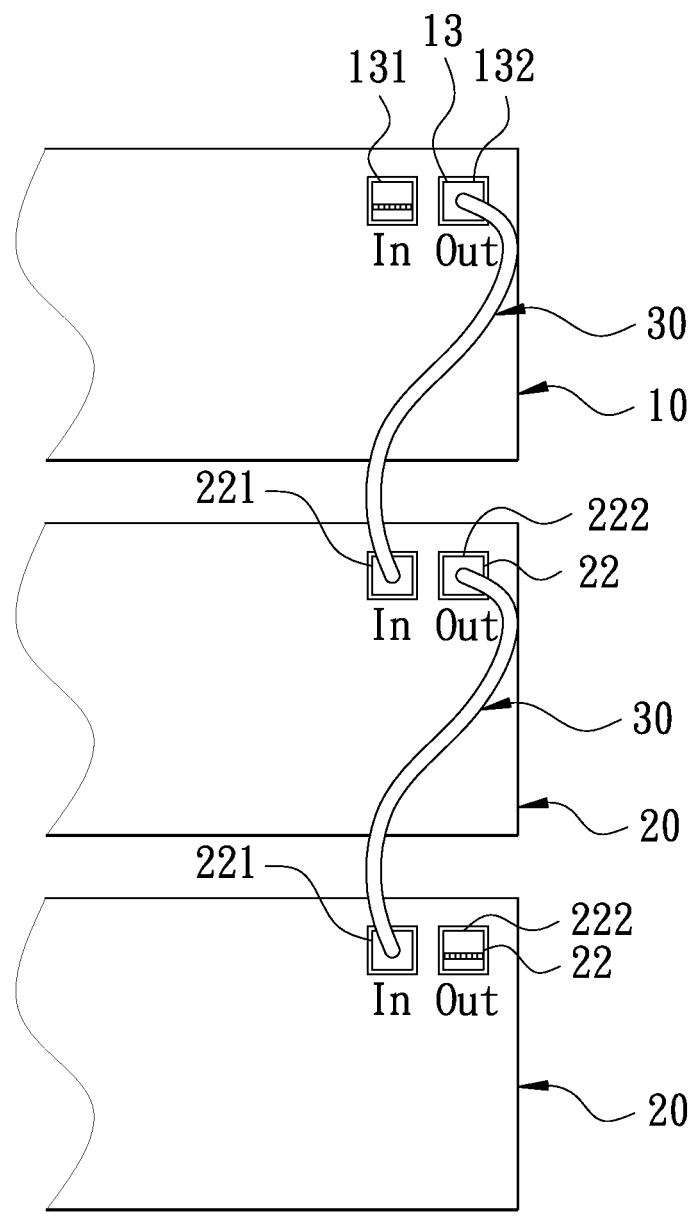
FIG. 1 is a schematic view according to a first embodiment of the present invention.
Figure 2:
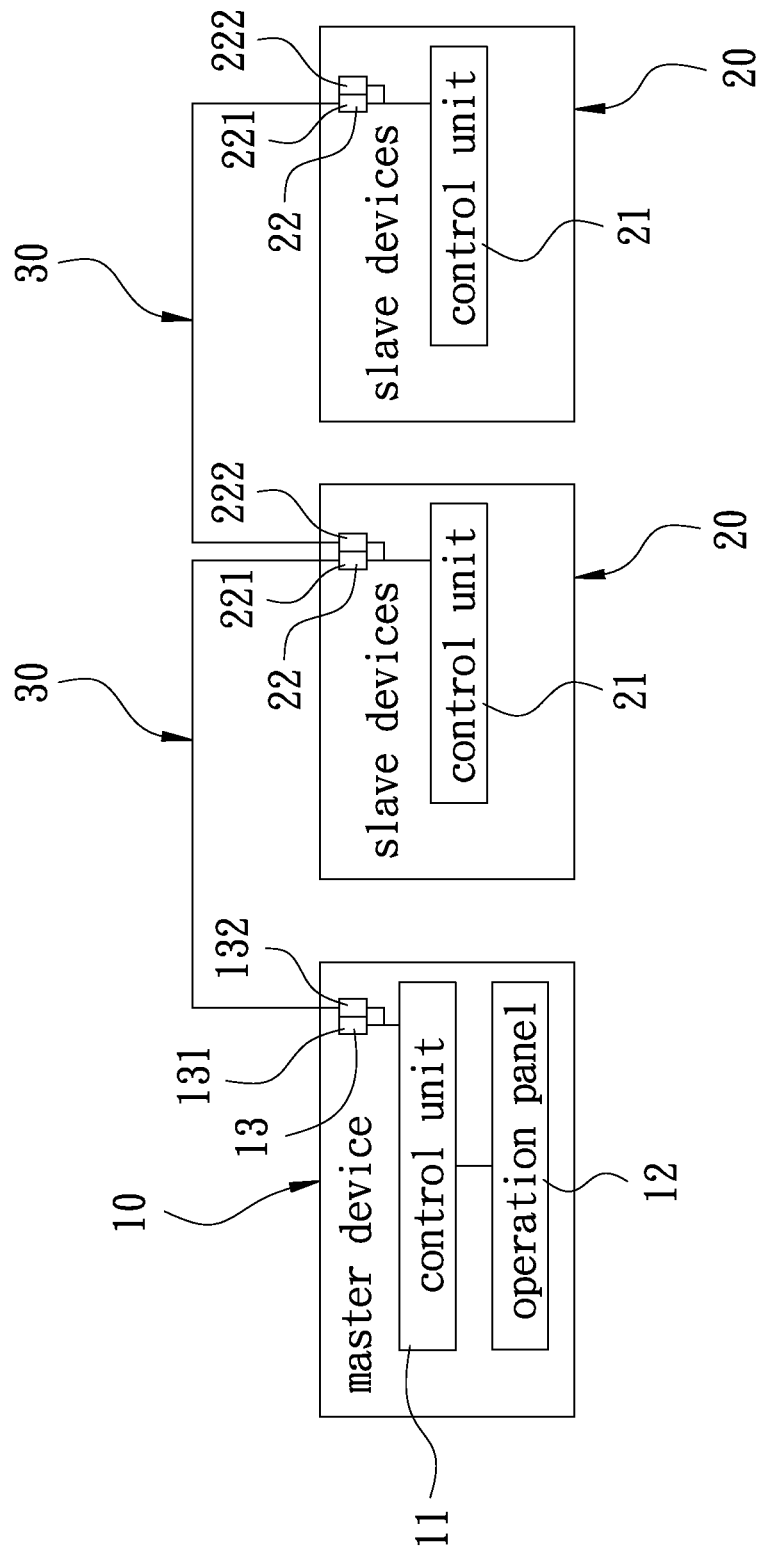
FIG. 2 is a block diagram according to the first embodiment of the present invention.

FIG. 1 is a schematic view according to a first embodiment of the present invention. FIG. 2 is a block diagram according to the first embodiment of the present invention. The present invention discloses a master/slave control system of an AC/DC power supply. The master/slave control system of the AC/DC power supply comprises a master device 10, a plurality of slave devices 20, and a plurality of local area network transmission interfaces 30.

The master device 10 can supply AC and DC power. The master device 10 comprises a control unit 11. In this embodiment of the present invention, the control unit 11 comprises a control circuit board. The master device 10 comprises an operation panel 12. The operation panel 12 is disposed at the front side of the master device 10. The operation panel 12 is connected with the control unit 11. The master device 10 is controlled through the operation panel 12. The master device 10 is provided with a local area network port 13. The local area network port 13 is disposed at the rear side of the master device 10. The local area network port 13 is connected with the control unit 11. In this embodiment of the present invention, the local area network port 13 has an input port 131 and an output port 132. Wherein, the input port 131 is for a control signal to be inputted to the control unit 11. The output port 132 is for the control unit 11 to output the control signal.

The slave devices 20 can supply AC and DC power. Each slave device 20 comprises a control unit 21. In this embodiment of the present invention, the control unit 21 comprises a control circuit board. Each slave device 20 is provided with a local area network port 22. The local area network port 22 is disposed at the rear side of the slave device 20. The local area network port 22 is connected with the control unit 21. In this embodiment of the present invention, the local area network port 22 has an input port 221 and an output port 222. Wherein, the input port 221 is for the control signal to be inputted to the control unit 21. The output port 222 is for the control unit 21 to output the control signal.

The local area network transmission interfaces 30 are respectively disposed between the master device 10 and one of the slave devices 20 and between the slave devices 20 for connecting the master device 10 and the slave devices 20. One end of each local area network transmission interface 30 is connected to the input port 131, 221, and another end of each local area network transmission interface 30 is connected to the output port 132, 222. In detail, one end of one of the local area network transmission interfaces 30 is connected to the output port 132 of the master device 10, and another end of the local area network transmission interface 30 is connected to the input port 221 of one of the slave devices 20. One end of another local area network transmission interface 30 is connected to the output port 222 of the slave device 20, and another end of the local area network transmission interface 30 is connected to the input port 221 of another slave device 20. The rest may be deduced by analogy. One slave device 20 is connected with another slave device 20 through one of the local area network transmission interfaces 30 so as to connect the slave devices 20. The slave devices 20 are connected with the mater device 10 through the local area network transmission interfaces 30. In this embodiment of the present invention, the local area network transmission interfaces 30 can elect Ethernet as the LAN networking, but not limited to this embodiment. The local area network transmission interfaces 30 can elect other LAN networking.

As shown in FIG. 1 and FIG. 2, one end of one of the local area network transmission interfaces 30 is connected to the output port 132 of the master device 10, and another end of the local area network transmission interface 30 is connected to the input port 221 of one of the slave devices 20. One end of another local area network transmission interface 30 is connected to the output port 222 of the slave device 20, and another end of the local area network transmission interface 30 is connected to the input port 221 of another slave device 20. Thus, the mater device 10 is connected with the slave devices 20 through the local area network transmission interfaces 30, such that the master device 10 can transmit the control signal to the slave devices 20 through the local area network transmission interfaces 30 for the slave devices 20 and the master device 10 to act synchronously. Through the local area network transmission interfaces 30, the master device 10 and the slave devices 20 can carry out a master/slave control. Besides, the speed of signal transmission of the local area network transmission interfaces 30 can reach 10/100 Mbit, having the advantage of high-speed local area network transmission. The control signal can be transmitted fast. When the master/slave control system of the AC/DC power supply uses the local area network transmission interfaces 30 for the master device 10 and the slave devices 20 to carry out the master/slave control, the control signal can be transmitted fast from the master device 10 to the slave devices 20, so that the slave devices 20 can act immediately to achieve a synchronous actuation with the master device 10. The master device 10 and the slave devices 20 of the master/slave control system of the AC/DC power supply are connected through the local area network transmission interfaces 30. This not only carries out the master/slave control but also executes a transmission function for other signals. Compared to the prior art, the master/slave control system of the AC/DC power supply of the present invention doesn't need a transmission interface. The local area network transmission interfaces 30 are used to execute multiple signal transmissions simultaneously to simplify the configuration of the master device 10 and the slave devices 20 as well as the connecting interface and the wiring, and the arrangement of the traditional series data communication interface and the controller area network can be omitted.

It is noted that the master/slave control system of the AC/DC power supply uses the local area network transmission interfaces 30 to connect the master device 10 with the slave devices 20 for the master/slave control. Thus, the master/slave control system of the AC/DC power supply has the advantage of easy programming and the property of automatic average-current. The user can operate it easily, and the system efficiency of the master/slave control can be enhanced greatly.

Figure 3:
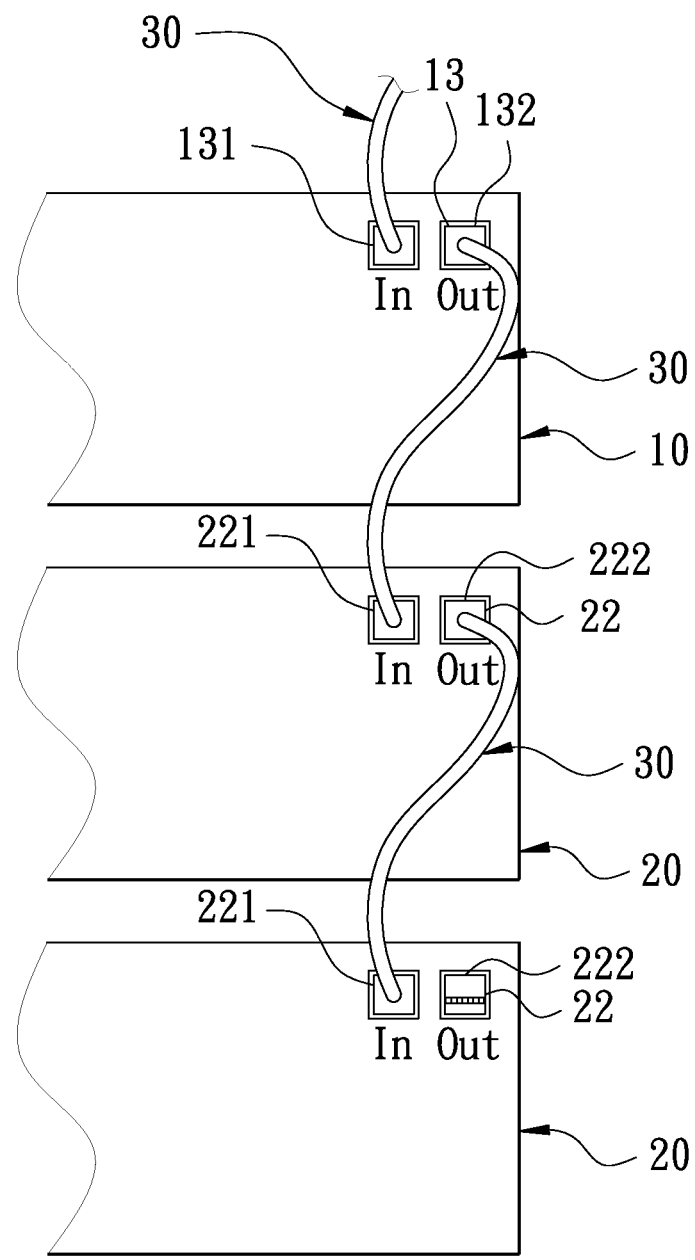
FIG. 3 is a schematic view according to a second embodiment of the present invention.
Figure 4:
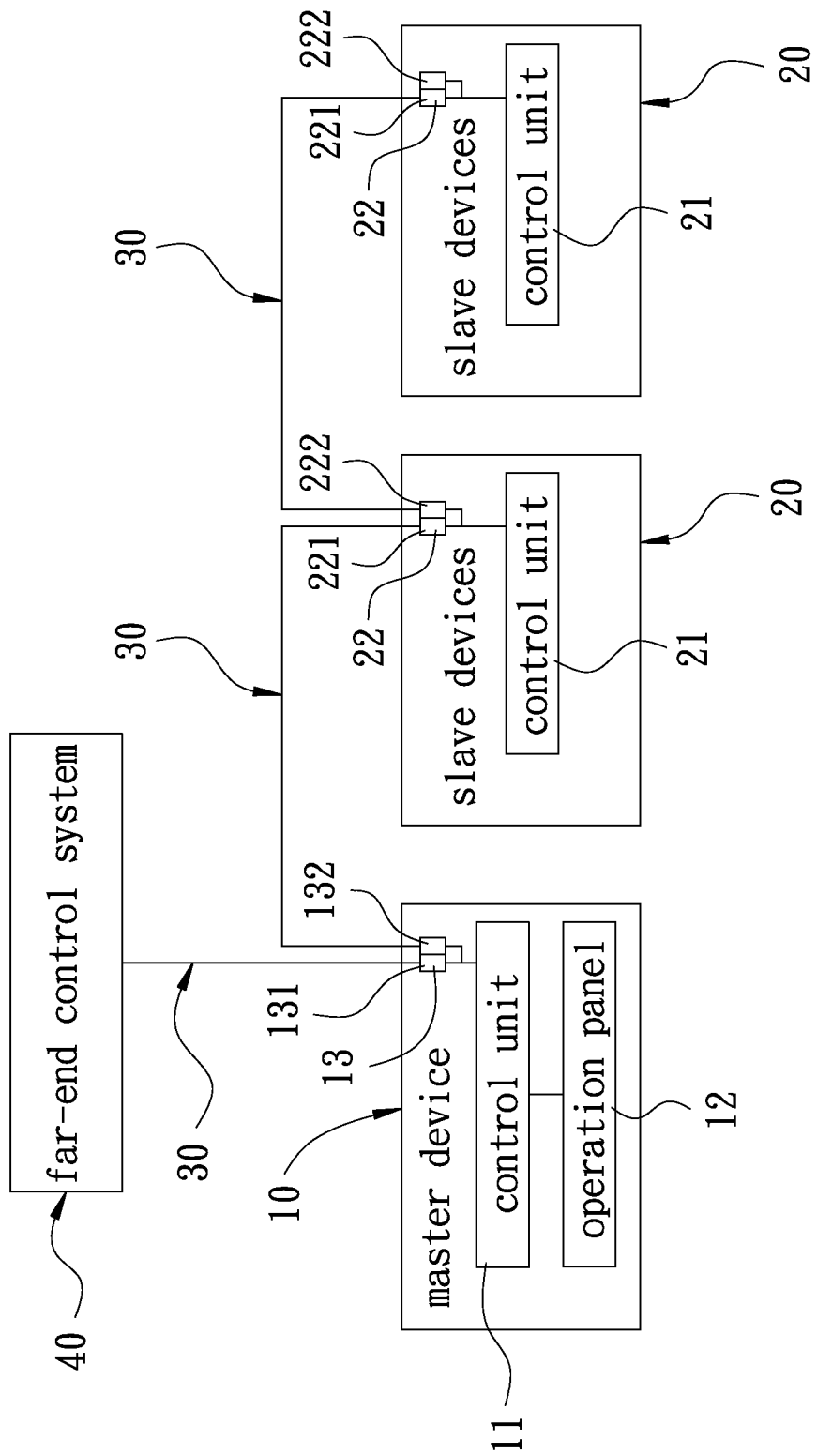
FIG. 4 is a block diagram according to the second embodiment of the present invention.

FIG. 3 is a schematic view according to a second embodiment of the present invention. FIG. 4 is a block diagram according to the second embodiment of the present invention. The second embodiment is substantially similar to the first embodiment with the exceptions described hereinafter. The master/slave control system of the AC/DC power supply further comprises a far-end control system 40. The far-end control system 40 is connected with the master device 10 through a local area network transmission interface 30 to control the master device 10 and the slave devices 20 remotely. In this embodiment of the present invention, the far-end control system 40 is a computer, but not limited to this embodiment. The far-end control system 40 can be a programmable logic controller to carry out the far-end control for the master/slave control system of the AC/DC power supply.

It is noted that the master device 10 of the master/slave control system of the AC/DC power supply can be directly controlled by the operation panel 12 in a manual way to carry out the master/slave control relative to the slave devices 20. The master device 10 of the master/slave control system of the AC/DC power supply can be remotely controlled by the far-end control system 40 to carry out the master/slave control.

The features and expected effects of the present invention are described as follows:

The master/slave control system of the AC/DC power supply of the present invention uses the local area network transmission interfaces to transmit the control signal fast and to carry out the master/slave control for the mater device and slave devices. The signal transmission efficiency of the master/slave control can be enhanced greatly, so that the master/slave control is more fast and prompt. The present invention avoids the arrangement of the traditional series data communication interface and the controller area network, and simplifies the configuration and wiring of the master device and the slave devices.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:
1. A master/slave control system comprising:
a master device;
the master device supplying AC and DC power;
the master device comprising a control unit, an operation panel and a local area network port;
the operation panel of the master device being connected with the control unit of the master device;
the local area network port of the master device being connected with the control unit of the master device;
a slave device;
the slave device supplying AC and DC power;
the AC and DC power supplied by the master device and the AC and DC power supplied by the slave device being independent from each other;
the slave device comprising a control unit and a local area network port;

the local area network port of the slave device being connected with the control unit of the slave device;
a local area network transmission interface;
one end of the local area network transmission interface being connected to the local area network port of the master device; and
another end of the local area network transmission interface being connected to the local area network port of the slave device for connecting the master device and the slave device.

2. The master/slave control system claimed in claim 1, further comprising:
a far-end control system; and
the far-end control system being connected with the master device through another local area network transmission interface.

3. The master/slave control system as claimed in claim 2, further comprising:
the far-end control system being a computer.

4. The master/slave control system as claimed in claim 2, further comprising:
the far-end control system being a programmable logic controller.

5. The master/slave control system as claimed in claim 1, further comprising:
the local area network port of the master device comprising an output port; and
the local area network port of the slave device comprising an input port.

6. The master/slave control system as claimed in claim 5, further comprising:
the one end of the local area network transmission interface being connected to the output port of the local area network port of the master device; and
the another end of the local area network transmission interface being connected to the input port of the local area network port of the slave device.

7. The master/slave control system as claimed in claim 1 further comprising:
another slave device;
the another slave device supplying AC and DC power;
the AC and DC power supplied by the master device, the AC and DC power supplied by the slave device and the AC and DC power supplied by the another slave device being independent from one another;
the another slave device comprising a control unit and a local area network port;
the local area network port of the another slave device being connected with the control unit of the another slave device;
another local area network transmission interface;
one end of the another local area network transmission interface being connected to the local area network port of the slave device; and
another end of the another local area network transmission interface being connected to the local area network port of the another slave device for connecting the slave device and the another slave device.

8. The master/slave control system as claimed in claim 7 further comprising:
the local area network port of the slave device comprising an output port; and
the local area network port of the another slave device comprising an input port.

9. The master/slave control system as claimed in claim 8 further comprising:
the one end of the another local area network transmission interface being connected to the output port of the local area network port of the slave device; and
the another end of the another local area network transmission interface being connected to the input port of the local area network port of the another slave device.

* * * * *